United States Patent [19]

Sunamori et al.

[11] 4,025,828
[45] May 24, 1977

[54] RECTIFIER AND RECTIFYING METHOD

[75] Inventors: Takashi Sunamori; Sachio Obana, both of Ohtake, Japan

[73] Assignee: Mitsubishi Rayon Co., Ltd., Tokyo, Japan

[22] Filed: July 21, 1975

[21] Appl. No.: 597,903

[30] Foreign Application Priority Data

July 24, 1974 Japan .............................. 49-84115
Sept. 11, 1974 Japan .............................. 49-103794
Nov. 22, 1974 Japan .............................. 49-134747

[52] U.S. Cl. .............................. 361/436; 252/62.2; 321/47
[51] Int. Cl.² .............................. H01G 9/16
[58] Field of Search .............. 317/233; 252/62.2; 321/47

[56] References Cited

UNITED STATES PATENTS

| | | | |
|---|---|---|---|
| 1,721,886 | 7/1929 | Shulimson | 317/233 |
| 1,889,417 | 11/1932 | Mershon | 317/233 |
| 2,585,947 | 2/1952 | Lilenfeld | 317/233 |
| 2,955,999 | 10/1960 | Tirrell | 317/233 |
| 3,111,610 | 11/1963 | Estes | 317/233 |
| 3,547,423 | 12/1970 | Jenny et al. | 252/62.2 |
| 3,670,212 | 6/1972 | Anderson | 317/233 |
| 3,767,541 | 10/1973 | Curtis | 252/62.2 |

*Primary Examiner*—Michael J. Lynch
*Assistant Examiner*—Joseph E. Clawson, Jr.
*Attorney, Agent, or Firm*—Cushman, Darby & Cushman

[57] ABSTRACT

A rectifier comprising a vessel filled with an aqueous solution or dispersion of a purified polyelectrolyte, and two electrodes immersed therein, wherein the ratio $S_1/S_2$ of the area $S_1$ of one electrode at the portion immersed in the aqueous solution or dispersion to the area $S_2$ of the other electrode at the portion immersed in the aqueous solution is from 1.5 to 300. When the electrode having the immersed area $S_1$ in the rectifier is connected through input terminals to an alternating current source, a direct current is obtained through output terminals from the other electrode.

12 Claims, 8 Drawing Figures

RECTIFIER AND RECTIFYING METHOD

This invention relates to a rectifier for converting an alternating current into a direct current, and to a method for rectifying an alternating current into a direct current by use of said rectifier.

Most of the prior art rectifiers utilized for converting an alternating current into a direct current are composed mainly of solid semiconductors such as transistors and diodes. These solid semiconductors, however, are produced with difficulty. Moreover, many semiconductors are required to be used particularly when a high voltage and high current capacity electric power is desired to be converted from an alternating current to a direct current. Accordingly, the costs of rectifiers utilized in this field are extremely high.

With an aim to obtain rectifiers which are relatively easy in production and are low in production cost, the present invention conducted extensive studies to find that an assembly in which two electrodes are immersed in a vessel filled with an aqueous solution or dispersion of a purified polyelectrolyte at a specific ratio of the surface area at the portion immersed in said aqueous solution or dispersion (the said area will be hereinafter referred to merely as immersed area) of one electrode to the immersed area of the other electrode, can be utilized as a rectifier.

An object of the present invention is to provide a rectifier for converting an alternating current into a direct current.

Another object of the invention is to provide a rectifier which is relatively easy in production and is low in production cost.

A further object of the invention is to provide a method for rectifying an alternating current into a direct current by use of the above-mentioned rectifier.

Other objects and advantages of the present invention will become apparent from the following description.

In accordance with the present invention, there is provided a rectifier comprising a vessel filled with an aqueous solution or dispersion of a purified polyelectrolyte, and two electrodes immersed therein, wherein the ratio $S_1/S_2$ of the immersed area $S_1$ of one electrode to the immersed area $S_2$ of the other electrode is from 1.5 to 300.

The present invention involves chiefly the two embodiments mentioned below. These embodiments are explained below with reference to the accompanying drawings, in which.

Figure 1:
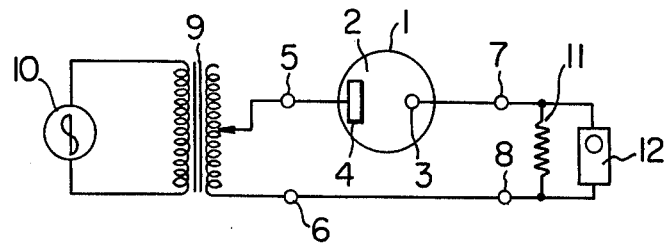
FIG. 1 shows an example of the wiring diagram of the rectifier of the present invention.
Figure 6:
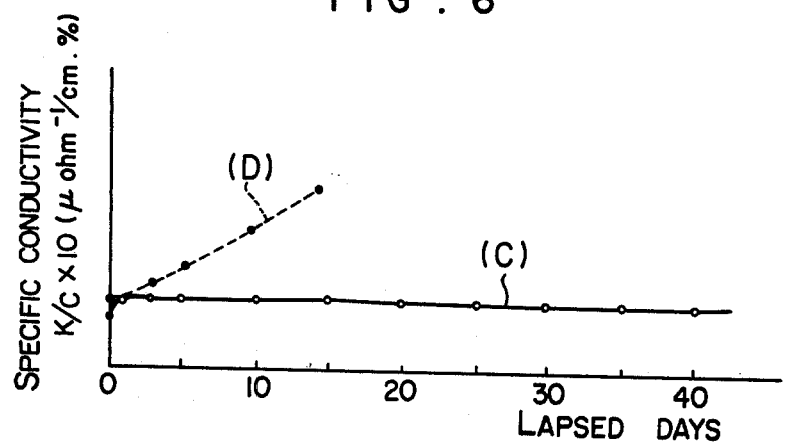
Figure 7:
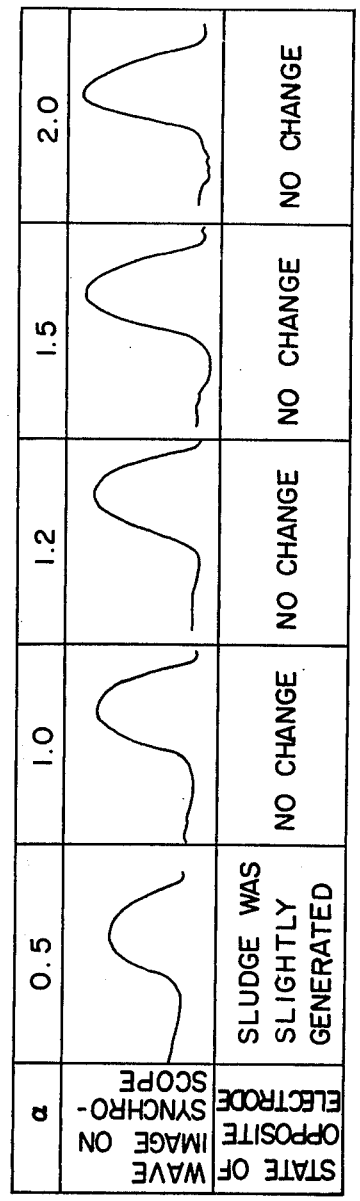

FIG. 6 is a graph showing the variation with the lapse of time of the specific conductivity of the polyelectrolyte used in the rectifier of the present invention, and of the specific conductivity of a polyelectrolyte out of the scope of the present invention; and FIG. 7 shows the relation between the degree of neutralization of the polyelectrolyte in the rectifier of FIG. 1 and the wave images on a synchroscope when said rectifier was used.

The first embodiment of the present invention is a rectifier obtained in such a manner that an aqueous solution or dispersion of a purified polyelectrolyte is charged into a vessel, and two electrodes are immersed in said aqueous solution at an immersed area ratio of from 1.5 to 300.

Figure 2:
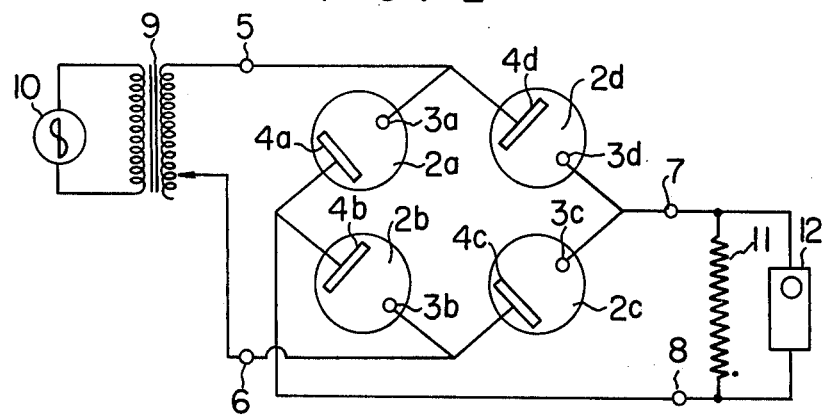
FIG. 2 shows another example of the wiring diagram of the rectifier of the present invention.

The second embodiment of the present invention is a composite rectifier obtained in such a manner that, as shown in FIG. 2, four rectifiers 2a, 2b, 2c and 2d prepared in the same manner as in the first embodiment are used; four electrodes 3a, 3b, 3c and 3d larger in immersed area and four electrodes 4a, 4b, 4c and 4d smaller in immersed area are connected with each other by use of wires so as to form such combinations as 3a with 4d, 3b with 4c, 4a with 4b and 3c with 3d; and the thus formed combinations are connected to an alternating current input terminal 5, another input terminal 6, an output terminal 8 and another output terminal 7, respectively. This rectifier can be used as a rectifier for the full-wave rectification of alternating current.

An example of the method for rectifying an alternating current into a direct current by use of the first embodiment rectifier is shown in FIG. 1, in which 1 is a vessel for an aqueous solution or dispersion of a salt of purified polyelectrolyte; 2 is an aqueous solution of a salt of purified polyelectrolyte; 3 is an electrode having a smaller immersed area in said aqueous solution; 4 is an electrode having a larger immersed area in said aqueous solution; 5, 6, 7 and 8 are input and output terminals; 9 is a transformer; and 10 is an alternating current source. In FIG. 1, the terminals 5 and 6 are connected through the transformer 9 to the alternating current source 10, and the terminals 7 and 8 are used as output terminals. Alternatively, however, it is possible to use the terminals 7 and 8 as input terminals and the terminals 5 and 6 as output terminals.

In order to analyze the mechanism at the time when the rectifier of the present invention rectifies an alternating current to a direct current, the present inventors carried out the following experiment using such apparatus as shown in FIG. 1.

Figure 3A:
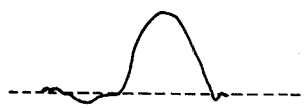
FIG. 3a shows a wave image appearing on a synchroscope when the rectifier of FIG. 1 was used.

A salt of a purified polycarboxylic acid resin was diluted with water to a solids concentration of about 15 wt %, and the resulting aqueous solution or dispersion was charged into the vessel 1. In the said aqueous solution or dispersion, an aluminum rod of 1 mm. in diameter and 20 cm² in surface area, as the electrode 3, and an aluminum plate of 200 cm² in surface area, as the electrode 4, were immersed at an electrode distance of 4 cm., and the two electrodes were connected to the terminals 5 and 7, respectively. Further, the input terminals 6 and 8 were provided and were so wired as shown in FIG. 1. Subsequently, a resistor 11 and a synchroscope 12 were inserted between the output terminals 7 and 8, and an alternating current of 60 Hz and 200 V. was impressed between the input terminals 5 and 6, whereby a direct current wave image appeared on the synchroscope. This wave image was as shown in FIG. 3a.

Such a rectification phenomenon from alternating current to direct current as mentioned above is considered to be as follows:

When an alternating current is impressed to the above-mentioned rectifier of FIG. 1, the current flowing from the electrode 4 to the electrode 3 can be made sufficiently high in density while the current flowing from the electrode 3 to the electrode 4 is relatively low in density, because the two electrodes are greatly different in immersed area. Accordingly, when an alternating current is desired to be rectified into a direct current by use of the rectifier having such a wiring as shown in FIG. 1, a positive charge is applied through the input terminal 5 to the electrode 4 and a negative charge is applied to the terminal 6, whereby the potential of the electrode 4 becomes higher than that of the electrode 3, so that the polycarboxylic acid resin electrophoretically migrates towards the electrode 4 while the neutralizing agent, which is the counter ion of the polycarboxylic acid resin, electrophoretically migrates towards the electrode 3, with the result that a current flows between the two electrodes. When the degree of neutralization with a base of the polycarboxylic acid resin used in the above is made higher, there is seen substantially no phenomenon that the polycarboxylic acid resin which has electrophoretically migrated towards the electrode 4 deposits, after discharge, onto the electrode 4 because the resin is high in water solubility, while the base is accumulated to an extremely high concentration in the vicinity of the electrode 3. In this case, the potential of the electricity taken out through the electrode 3 at the terminal 7 becomes higher than that of the terminal 8. On the other hand, when, according to the cycle of alternating current, a negative charge is applied through the terminal 5 to the electrode 4 and a positive charge is applied to the terminal 6, the electrophoretic migration of the polycarboxylic acid resin to the vicinity of the electrode 3 becomes less, since the density of the current flowing from the electrode 3 to the electrode 4 is extremely low, and, at the same time, the water-solubility of the polycarboxylic acid, which has electrophoretically migrated to the vicinity of the electrode 3 is greatly increased by the force of the base accumulated to an extremely high concentration in the vicinity of the electrode 3, with the result that the resin is re-dissolved in the aqueous solution. In this case, therefore, substantially no current flows between the electrodes 3 and 4.

When a salt of a basic resin is used as the salt of the polyelectrolyte in the above-mentioned method, the accumulation of acid takes place in the vicinity of the electrode 3 to make it possible to rectify an alternating current into a direct current.

Figure 5:
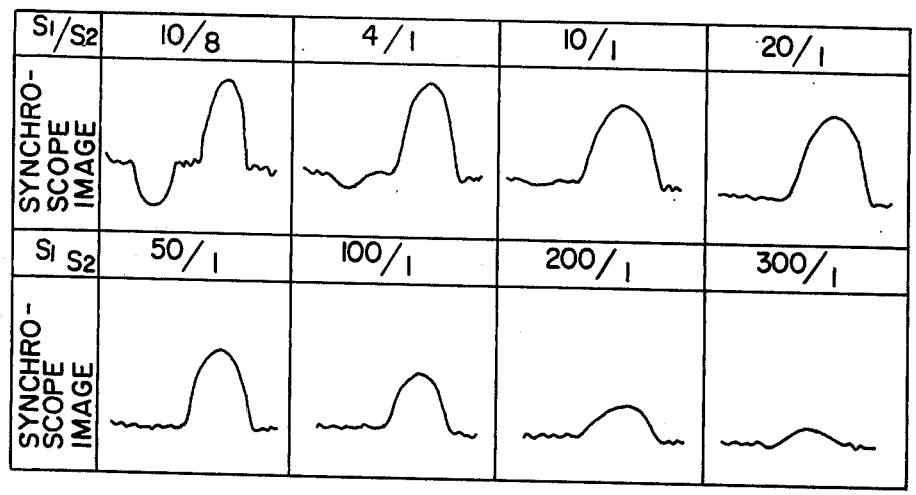
FIG. 5 shows the relation between the immersed area ratio $S_1/S_2$ of two electrodes and the wave images on a synchroscope when the rectifier of FIG. 1 was used.

In the above-mentioned method, the ratio of the immersed area of the electrode 4 to that of the electrode 3, i.e. $S_1/S_2$, was varied as shown in FIG. 5 by varying the immersed area $S_2$ of the electrode 3, and the wave images which appeared on a synchroscope were shown in FIG. 5. From the results shown in FIG. 5, it is understood that if the immersed area ratio $S_1/S_2$ of the two electrodes is less than 1.5 the difference in density of current flowing, according to the cycle of alternating current, from the electrode 3 to the electrode 4 is difficult to make large, and no element having such an excellent rectification effect as mentioned above can be obtained. On the other hand, if the said immersed area ratio $S_1/S_2$ is more than 300, the density of current flowing from the electrode 4 to the electrode 3 also becomes low, and no industrially utilizable, rectified electric power can be taken out of such an element. It is therefore preferable that the said ratio $S_1/S_2$ is in the range from 1.5 to 300, preferably from 4 to 200, more preferably from 10 to 100.

If the distance between the electrode 3 and the electrode 4 is excessively short, the density of current flowing between the two electrodes becomes greatly different between the central portion and the peripheral portion of each electrode. In the present invention, therefore, the distance between the two electrodes is preferably made 1 mm or more.

The voltage of the alternating current to be rectified is in the range from 5 to 500 V, preferably from 20 to 450 V. Further, the density of current flowing between the two electrodes is preferably 80 A/m$^2$ or less.

If the voltage and density of current impressed between the two electrodes are excessively high, the aqueous solution or dispersion constituting the rectifier of the present invention gives rise to such undesirable phenomena as electrolysis reaction, redox reaction on the electrode surfaces, etc. with the result that the rectifier is undesirably deteriorated in characteristics.

As the material of each electrode, any material may be used so far as it is electroconductive. Concrete examples of such a material are metals such as stainless steel, nickel, alloys thereof, copper, Al, Ti, Nb, W, Zr, silver and gold, and carbon. When a salt of a basic resin is used as the salt of purified polyelectrolyte, it is preferable to use electrodes made of a metal selected from Al, Ti, Nb, Ta, W and Zr, or an alloy of said metals, or the said electrodes which have been subjected to chemical or electrolytic oxidation. The rectification efficiency of a rectifier prepared by use of electrodes made of such materials as mentioned above is far more excellent than that of a rectifier element using electrodes made of other materials.

Figure 4:
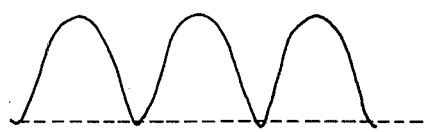
FIG. 4 shows a wave image appearing on a synchroscope when the rectifier of FIG. 2 was used.

In FIG. 2, there is shown a wiring diagram at the time when an alternating current is rectified into a direct current by use of the second embodiment rectifier of the present invention, in which a salt of a polycarboxylic acid resin is used as the salt of purified polyelectrolyte. From the aforesaid explanation of the first embodiment, it is clear that only when the potential of the electrode 4 is higher than that of the electrode 3, a current flows between the two electrodes. In the wiring diagram shown in FIG. 2, the wiring is so made that the potentials of the electrodes 3c and 3d become identical with the potential of the terminal 7, and the potentials of the electrodes 4a and 4b become identical with the potential of the terminal 8. When an alternating current is impressed between the input terminals 5 and 6 in such a state as mentioned above, the relation between the potentials of the electrodes, at the time when a positive charge is applied to the electrode 4d and a negative charge to the electrode 3d, becomes 4d > 3d, 3d = terminal 7, 4d = terminal 8, 4b > 3b and terminal 7 > terminal 8, and the current flows in such an order as 4d → 3d → terminal 7 → terminal 8 → 4b → 3b. In this case, the relation between the potentials of the other electrodes becomes 3a > 4a and 3c > 4c, and no current flows at all between the electrodes in the rectifier. On the other hand, when a negative charge is applied to the electrode 3a and a positive charge is applied to the electrode 4c according to the cycle of alternating current, the relation between the potentials of the electrodes becomes 4c > 3c, 3c = terminal 7, terminal 8 = 4a, 4a > 3a, and terminal 7 > terminal 8, and the current flows in such an order as 4c → 3c → terminal 7 → terminal 8 → 4a → 3a. A synchroscope wave image obtained in the above case is as shown in FIG. 4.

The salt of a purified polyelectrolyte used in the present invention is a salt of an acidic resin, a representation of which is a polycarboxylic acid resin, and a salt of a basic resin, a representative of which is a polyamino resin.

Preferable as the acidic resin is a polycarboxylic acid resin having an acid value of 5 or more, preferably from about 10 to about 800 and a molecular weight of 1,000 to 25,000. Concrete examples of said resin are carboxyl group-containing polyester resins, carboxyl group-containing butadiene polymers and carboxyl group-containing vinyl homo- or co-polymers of the following acidic vinyl monomer. The vinyl polymers are preferably those which have been prepared by copolymerizing at least 1 mole % of an acidic vinyl monomer with other copolymerizable vinyl monomer. Concrete examples of the acidic vinyl monomer used as the starting material in preparing the vinyl polymers include acrylic acid, methacrylic acid, crotonic acid, maleic acid, itaconic acid, α-methyleneglutaric acid, hydroxyethyl (meth)acrylate monosuccinates, hydroxypropyl (meth)acrylate monosuccinates, hydroxyethyl (meth)acrylate monophthalates, hydroxypropyl (meth)acrylate monosuccinates and hydroxyethyl (meth)acrylate monotrimellitates. Concrete examples of said other copolymerizable vinyl monomer include methyl (meth)acrylates, ethyl (meth)acrylates, butyl (meth)acrylates, n-propyl (meth)acrylates, isopropyl (meth)acrylates, isobutyl (meth)acrylates, pentyl (meth)acrylates, cyclohexyl (meth)acrylates, octyl (meth)acrylates, 2-ethylhexyl (meth)acrylates, nonyl (meth)acrylates, decyl (meth)acrylates, dodecyl (meth)acrylates, tridecyl (meth)acrylates, stearyl (meth)acrylates, lauryl (meth)acrylates, benzyl (meth)acrylates, phenyl (meth)acrylates, (meth)acrylamides, styrene, α-methylstyrene, vinyl acetate, vinyl propionate, Versatic acid vinyl esters, vinyl chloride, vinylidene chloride, methoxymethyl (meth)acrylamides, butoxymethyl (meth)acrylamides, propoxymethyl (meth)acrylamides, N-2-oxa-4-methylpentyl (meth)acrylamides, hydroxyethyl (meth)acrylates, hydroxypropyl (meth)acrylates, hydroxybutyl (meth)acrylates, hydroxyphexyl (meth)acrylates, acrylonitrile, methacrylonitrile and fluoroalkyl (meth)acrylates. The above-mentioned vinyl polymers can be prepared according to such an ordinary process as solution polymerization, bulk polymerization or emulsion polymerization process.

Concrete examples of the neutralizing agent used in preparing the above-mentioned salt of acidic resin include inorganic bases such as sodium hydroxide and potassium hydroxide, and organic bases such as ammonia, methylamine, ethylamine, dimethylamine, diethylamine, methylethylamine, trimethylamine, triethylamine and dimethylaminoethanol. The degree of neutralization is preferably from 30 to 500%, more preferably 80 to 200%.

If there is used a rectifier prepared by use of an aqueous solution or dispersion of a salt of an acid resin having an acid value of less than 5, it is difficult to take out a rectified direct current having a sufficient voltage and current density. On the other hand, if there is used a rectifier prepared by use of an aqueous solution of a salt of an acidic resin having an acid value of more than 800, it is difficult to sufficiently rectify an alternating current into a direct current.

Further, the above-mentioned acidic resin contains large amounts of such low molecular weight acid substances as acidic monomers, used as the starting materials in preparing the acidic resin, or their low polymerization products, a polymerization catalyst and its decomposition product, and a molecular weight regulator and its decomposition products. Salts of the said low molecular weight acidic substances are extremely high in electrophoretic property, so that when a recitifier prepared by use of an aqueous solution of a salt of such an acidic resin as mentioned above is used in the same rectification as in the case of the first embodiment of the present invention, the said low molecular weight substances electrophoretically migrate towards the electrode 3 to make it impossible to take out a sufficiently rectified direct current. Accordingly, the content of said low molecular weight substances in the acidic resin is preferably 5 wt. % or less.

For the preparation of the salt of a purified acidic resin, there may be adopted such a procedure that an organic solvent solution or aqueous solution of an acidic resin or its salt is treated with an ion-exchange resin, ion-exchange fiber, dextran gel or acrylamide gel having an anion-exchangeability to adsorb the aforesaid low molecular weight substances on the anion exchanger, which is then removed from the solution of the acidic resin or its salt. In this procedure, it is particularly preferable to use an anion-exchange fiber or resin as the anion exchanger. If necessary, the acidic resin or its salt, which has been treated with the anion-exchanger as mentioned above, is additionally incorporated with a base and then diluted with deionized water to a solids concentration of less than 40 wt. %, and the resulting aqueous solution is treated with a cation-exchange fiber or resin, which is then removed from the said aqueous solution to prepare an aqueous solution of a salt of purified polyelectrolyte that is markedly excellent in stability and rectification characteristics.

The results of measurement of the variation with the lapse of time of the specific conductivity of a 15 wt. % aqueous solution of a salt of purified polyelectrolyte which has been subjected to such a treatment with anion and cation exchangers as mentioned above, and of the variation with time of the specific conductivity of a 15 wt. % aqueous solution of a salt of polyelectrolyte which has not been purified at all, are shown by the curves (C) and (D) in FIG. 6. In FIG. 6, the curve (C) shows the results of measurement of the variation with the lapse of time of the specific conductivity of the aqueous solution of a salt of purified polyelectrolyte, and the curve (D) shows the results of measurement of the variation with the lapse of time of the specific conductivity of the aqueous solution of a salt of unpurified polyelectrolyte. From these results, it is understood that the rectifier of the present invention always shows stabilized characteristics.

The basic resin used in the present invention isa homo- or co-polymer of a basic vinyl monomer which has a molecular weight of about 1,000 to 25,000. Concrete examples of said basic vinyl monomer include dimethylaminoethyl (meth) acrylates, diethylaminoethyl (meth) acrylates, dibutylaminoethyl (meth) acrylates, dimethylaminopropyl (meth) acrylamides, N-(2-morpholinoethyl) (meth) acrylamides, N-(2-dimethylaminoethyl) (meth) acrylamides, 2-aminoethyl vinyl ether, 5-aminopentyl vinyl ether, 2-morpholinoethyl vinyl ether, 2-vinylimidazole, N-methyl-2,4-dimethylimidazole, N-vinylimidazoline, 2-vinylpyridine, 3-vinylpyridine, 4-vinylpyridine and 5-vinylpyridine. As the basic resin, a homopolymer or copolymer of the above-mentioned monomers may be used. In the case of copolymer, the said monomers are preferably copolymerized in a proportion of 1 mole % or more. As monomers copolymerizable therewith, there may be used those which are used in the preparation of the acidic vinyl resins. The degree of neutralization is preferably from 30 to 500 %, more preferably 80 to 200 %.

Concrete examples of the acid used in preparing a salt of the above-mentioned basic resin include inorganic acids such as hydrochloric, sulfuric and phosphoric acids, and organic acids such as acetic, formic, oxalic, maleic, succinic and p-toluenesulfonic acids.

For the preparation of an aqueous solution or dispersion of a salt of purified polyelectrolyte from the above-mentioned basic resin or its salt, there may be adopted such a procedure that the basic resin or its salt is treated with a cation exchanger to adsorb strongly basic impurities contained in the basic resin or its salt on the cation exchanger, which is then removed, the thus treated basic resin or its salt is incorporated with an acid and diluted with deionized water to a solids concentration of less than 40 wt. %, and the resulting aqueous solution is further treated with an anion exchanger.

Preferable as the above-mentioned salt of purified acidic resin is one which has a $pK_a$ (r) value, as defined by the formula (I) shown below, of 8.0 or more, an $n$ value of 0.5 to 1.5 and an $\alpha$ value of 0.3 or more, preferably 0.8 to 2.0, and which contains 5 wt. % or less of acidic impurities having a $pK_a$ (e) value, as defined by the formula (II) shown below, at least 0.5 smaller than the $pK_a$ (r) value of the main component of the said acidic resin:

$$pH = pK_a (r) + n \log (\alpha/1 - \alpha) \qquad (I)$$

wherein pH is the pH value of an aqueous solution or dispersion of the salt of the acidic resin; $pK_a$ (r) is the constant $-\log K_a$ (r); $K_a$ (r) is the dissociation constant in water of the acidic resin; $n$ is a numeral constant; and $\alpha$ is the degree of neutralization of the acidic resin with a base, $$pH = pK_a (e) + \log (\alpha_1 /1 - \alpha_1) \qquad (II)$$

wherein pH is the pH value of an aqueous solution of the acidic impurities; $pK_a$ (e) is the constant $-\log K_a$ (e); $K_a$ (e) is the dissociation constant in water of the acidic impurities; and $\alpha_1$ is the degree of neutralization of the acidic impurities with a base.

Preferable as the above-mentioned salt of purified basic resin is one which has a $pK_b$ (r) value, as defined by the formula (III) shown below, of 6.0 or more, an $n'$ value of 0.5 to 1.5 and an $\alpha'$ value of 0.3 or more, preferably 0.8 to 2.0, and which contains 5 wt. % or less of basic impurities having a $pK_b$ (e) value, as defined by the formula (IV) shown below, at least 0.5 smaller than the $pK_b$ (r) value of the main component of the said basic resin:

$$pOH = pK_b (r) + n' \text{long} (\alpha'/1 - \alpha') \qquad (III)$$

wherein pOH is the pOH value of an aqueous solution of the salt of the basic resin; $pK_b$ (r) is the constant $-\log K_b$ (r); $K_b$ (r) is the dissociation constant in water of the basic resin; $n'$ is a numeral constant; and $\alpha'$ is the degree of neutralization of the basic resin with an acid, $$pOH = pK_b (e) + \log (\alpha_1'/1 - \alpha_1') \qquad (IV)$$

wherein pOH is the pOH value of an aqueous solution of the basic impurities; $pK_b$ (e) is the constant $-\log K_b$ (e); $K_b$ (e) is the dissociation constant in water of the basic impurities; and $\alpha_1'$ is the degree of neutralization of the basic impurities with an acid.

The $pK_a$ (r) value of the above-mentioned acidic resin (or the $pK_b$ (r) value of the above-mentioned basic resin) should be at least 8.0 (or 6.0). A rectifier, prepared by using as the polyelectrolyte a salt of an acidic (or basic) resin having a $pK_a$ (r) value of less than 8.0 (or a $pK_b$ (r) value of less than 6.0), is not sufficient in rectification characteristics.

The $n$ (or $n'$) value is a parameter showing the degree of spreading in water of the salt of the acidic (or basic) resin. When a salt of the acidic (or basic) resin is dissolved or dispersed in water and the resulting solution or dispersion is allowed to stand, the $n$ (or $n'$) value becomes closer to the equilibrium value 1 with the lapse of time. The closer the initial $n$ (or $n'$) value to 1 when a salt of acidic (or basic) resin is dissolved or dispersed in water, the higher the stability of the salt in water. A rectifier, prepared by use of an aqueous solution of a salt of a resin which has an $n$ (or $n'$) value closer to 1, can always show definite rectification characteristics. Accordingly, the salt of the resin used in the present invention should have an $n$ (or $n'$) value in the range from 0.5 to 1.5.

The $\alpha$ (or $\alpha'$) value of the salt of the resin used in the present invention should be at least 0.3. A recitifier, prepared by using as the polyelectrolyte an aqueous solution of a salt of resin having an $\alpha$ (or $\alpha'$) value of less than 0.3, cannot display definite and sufficient rectification characteristics, since the aqueous solution or dispersion is low in stability.

Further, the salt of the aforesaid resin should not contain more than 5 wt. % of strongly acidic (or basic) impurities having a $pK_a$ (e) [or $pK_b$ (e)] value of at least 0.5 smaller than the $pK_a$ (r) [or $pK_b$ (r)] of the main component of the resin. A rectifier, prepared by use of an aqueous solution of a salt of a resin containing more than 5 wt. % of said impurities, cannot show sufficient rectification characteristics.

The rectifier of the present invention has markedly excellent characteristics as an element for converting an alternating current into a direct current. Moreover, it is not only far simpler in preparation and lower in cost than such a rectifier as transistor or diode, but also is well comparable thereto in characteristics. Heretofore, no rectifier utilizing a water-soluble or water-dispersible resin has ever been proposed. Thus, the present invention greatly contributes to the future development of techniques in this field. The rectifier of the present invention can successfully be utilized as a rectifier for direct current electrodeposition coating or plating.

The present invention is illustrated in more detail below with reference to examples, but the examples are by way of illustration and not by way of limitation.

EXAMPLE 1

A monomer mixture of the composition shown below was charged into a flask equipped with a stirrer, a reflux condenser and a thermometer, heated to 70° C in a period of 2.5 hours, and then polymerized at said temperature for 5.5 hours. Thereafter, the contents of the flask were heated to 75° C and further polymerized at said temperature for 4 hours to prepare a resin solution (A).

|  | Parts by weight |
|---|---|
| Tridecyl methacrylate | 35.9 |
| Styrene | 26.3 |
| 2-Hydroxyethyl methacrylate | 11.6 |
| N-Butoxymethyl acrylamide | 13.3 |
| Itaconic acid | 3.9 |
| 2-Mercaptoethanol | 1.07 |
| Isopropanol | 78.1 |
| Azobisisobutyronitrile | 2.8 |

The acid value of the polycarboxylic acid resin contained in said resin solution (A) was 32.5.

To 300 parts by weight of this resin solution (A) were added 7.5 parts by weight of β-dimethylaminoethanol ($\alpha \approx 0.8$), 3 parts by weight of an OH type anion-exchange resin having an average particle size of less than 150 μ, and 10 parts by weight of deionized water, and the resulting mixture was stirred at 40° C for 3 hours. Thereafter, the mixture was incorporated with 5 parts by weight of a cellulosic filter aid, stirred and then filtered by means of a filter press to prepare a solution (B) of a salt of purified polycarboxylic acid resin. The acid value of the purified polycarboxylic acid resin was 28.4. From this, it was confirmed that the resin solution (A) contained low molecular weight acidic impurities in an amount corresponding to an acid value of 4.1. The purified polycarboxylic acid resin had a $pK_a(r)$ value of 9.10 and an $n$ value of 1.16.

To 120 parts by weight of the resin solution (B) was added 380 parts by weight of deionized water to prepare a resin solution (C), which was then charged into a plastic-made vessel. In the resin solution (C), an aluminum plate of 50 cm² in surface area was immersed, as one electrode (as the electrode 4 in FIG. 1), to an immersed area of $S_1$, while an aluminum plate of 2 mm in width was immersed, as the other electrode (as the electrode 3 in FIG. 1), to an immersed area of $S_2$, to prepare a rectifier. The thus prepared rectifier was so wired as shown in FIG. 1, and the immersed area of the electrode 3 in the aqueous solution was varied to obtain such $S_1/S_2$ ratios as shown in FIG. 5. A resistor and a synchroscope were inserted between the output terminals 7 and 8, and an alternating current of 60 Hz and 200 V was impressed between the input terminals 5 and 6. The wave images appearing on the synchroscope were as shown in FIG. 5.

Figure 3B:
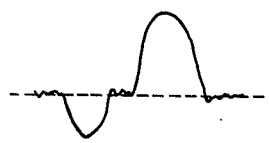
FIG. 3b shows a wave image appearing on a synchroscope when a rectifier out of the scope of the present invention was used.

A rectifier was prepared in the same manner as above, except that the resin solution (C) was replaced by a mixed solution comprising 120 parts by weight of the resin solution (A) and 380 parts by weight of deionized water. Using this rectifier, the rectification of an alternating current into a direct current was carried out in the same manner as above, but the alternating current could not be converted at all into a direct current. The wave image appearing on the synchroscope, when the $S_1/S_2$ ratio was made 10, was as shown in FIG. 3b.

A mixture comprising 300 parts by weight of the resin solution (A), 4.35 parts by weight of β-dimethylaminoethanol and 63 parts by weight of an 80 % isopropanol solution of butoxymethylated melamine resin were sufficiently stirred. 120 Parts by weight of this resin mixture was mixed with 75 parts by weight of titanium oxide in a ball mill for 24 hours, and to the mixture was further added 240 parts by weight of the said resin mixture. The resulting mixture was stirred for 24 hours to obtain a white enamel. To 1,000 parts by weight of the thus obtained white enamel were added 10 parts by weight of an OH type anion-exchange resin (particle size ranging from 50 to 150 μ) and 50 parts by weight of deionized water, and the resulting mixture was stirred at 40° C for 3 hours. Thereafter, the mixture was incorporated with 5 parts by weight of a cellulosic filter aid, sufficiently stirred and then filtered by means of a filter press to prepare a white enamel (D) containing the purified resin as paint binder. This white enamel (D) was diluted with deionized water to a solids concentration of 15 wt. %. To 300 parts by weight of the resulting aqueous dispersion was added 10 parts by weight of an H type cation-exchange resin, and the resulting mixture was sufficiently stirred. Thereafter, the cation-exchange resin was removed by filtration to obtain an aqueous paint having a pH of 8.3 and a bath specific conductivity of $2.05 \times 10^2$ μ·ohm$^{-1}$/cm.

The aqueous paint obtained in the above manner was charged into an electrodeposition coating bath. In the bath, a zinc phosphate-treated steel plate (0.8 × 170 × 150 mm), as an article to be coated, and a stainless steel plate same in size as said steel plate, as an opposite electrode, were immersed at an electrode distance of 4 cm with an immersed area ratio $S_1/S_2$ of 10. The article to be coated was connected to the output terminal 7 of such rectification apparatus as shown in FIG. 1 while the opposite electrode was connected to the output terminal 8, and electrodeposition coating was effected with impression of a voltage of from 100 to 250 V to obtain a coated plate. The coated plate was washed with water and then baked at 180° C to form a film on the plate. The properties of the film were as shown in Table 1.

Table 1

| Impressed voltage | 100 | 150 | 200 | 250 |
|---|---|---|---|---|
| Film thickness (μ) | 7 | 13 | 22 | 31 |
| Gloss (%) | 68 | 74 | 83 | 86 |

EXAMPLE 2

Five kinds of resin solutions were prepared in the same manner as in the case of the resin solution (B) prepared in Example 1, except that the degree of neutralization α was varied to 0.5, 1.0, 1.2, 1.5 and 2.0. Using these resin solutions, rectifiers were prepared in the same manner as in Example 1, and an alternating current of 60 Hz and 200 V was impressed to each of the rectifiers. The wave images appearing on the synchroscope were as shown in FIG. 7.

EXAMPLE 3

To 120 parts by weight of the resin solution (B) prepared in Example 1 was added 380 parts by weight of deionized water to form an aqueous resin solution, which was then charged into four plastic vessels. Into each of these four vessels, the same two electrodes as in Example 1 were immersed with an immersed area ratio $S_1/S_2$ of 10 to prepare four rectifiers.

These four rectifiers were so wired as shown in FIG. 2, an alternating current of 40 Hz and 200 V was impressed between the input terminals 5 and 6, and the wave image of a current taken out of the output terminals 7 and 8 was confirmed by means of a synchroscope to obtain such a result as shown in FIG. 4.

Electrodeposition coating was effected in the same manner as in Example 1, except that the rectifier was replaced by the above-mentioned composite rectifier, to obtain a coated article bearing a film having a thickness of 28 μ and a gloss value of 86 %.

EXAMPLE 4

A monomer mixture of the composition shown below was polymerized in the same manner as in Example 1 to prepare a resin solution (E) having a $pk_a$ (r) value of 8.10 and an $n$ value of 1.26.

|  | Parts by weight |
|---|---|
| 2-Ethylhexyl acrylate | 39.9 |
| Styrene | 25.8 |
| N-Butoxymethyl acrylamide | 18.4 |
| Itaconic acid | 4.0 |
| Azobisisobutyronitrile | 2.93 |
| 2-Mercaptoethanol | 1.12 |
| Isopropanol | 62.5 |

On the other hand, a monomer mixture of the composition shown below was also polymerized in the same manner as in Example 1 to prepare a resin solution (F) having a $pK_a$ (r) value of 8.86 and an $n$ value of 1.03.

|  | Parts by Weight |
|---|---|
| Ethyl acrylate | 24.8 |
| Styrene | 22.8 |
| N-Butoxymethyl acrylamide | 19.1 |
| Itaconic acid | 3.23 |
| Azobisisobutyronitrile | 2.93 |
| 2-Mercaptoethanol | 1.12 |
| Isopropanol | 47.4 |

Each of the resin solutions (E) and (F) was neutralized with β-dimethylaminoethanol to an α value of 0.8, treated with an OH type anion-exchange resin in the same manner as in Example 1, and then diluted with deionized water to a solids concentration of 15 wt. %. Using the resulting two aqueous solutions, two rectifiers each having an electrode immersed area ration $S_1/S_2$ of 10 were prepared in the same manner as in Example 1. Each of the two rectifiers was so wired as shown in FIG. 1, an alternating current of 60 Hz and 200 V was impressed between the input terminals 5 and 6, and the wave image of currents taken out of the output terminals 7 and 8 was investigated by means of a synchroscope to find that the wave image was one which had been rectified substantially completely.

Electrodeposition coating was effected in the same manner as in Example 1, except that the electrodeposition coating electric source was replaced by each of the above-mentioned two rectifiers and the impressed voltage was fixed to 200° V, to obtain a coated article bearing a film having a film thickness of 23 μ and a gloss value of 84 %, and a coated article bearing a film having a thickness of 25 μ and a gloss value of 83 %.

EXAMPLE 5

A monomer mixture of the composition shown below was charged into the same flask as in Example 1, and was polymerized at 70° C for 6 hours and then at 75° C for 4 hours to prepare a resin solution (G).

|  | Parts by weight |
|---|---|
| N-Vinylimidazoline | 10 |
| N-2-Oxa-4-methylpentyl acrylamide | 25 |
| Butyl acrylate | 40 |
| Styrene | 25 |
| 2-Mercaptoethanol | 1 |
| Azobisisobutyronitrile | 2 |
| Isopropanol | 100 |

To the resin solution (G) was added acetic acid in such a proportion that the α' value became 1.3. To 1,000 parts by weight of this resin solution were added 50 parts by weight of deionized water and 10 parts by weight of an OH type cation-exchange resin having a particle size of 50 to 150 μ, and the resulting mixture was stirred at 40° C for 3 hours. Thereafter, the mixture was incorporated with a cellulosic filter aid and sufficiently stirred, and then the cation-exchange resin was removed by filtration using a filter press to form a resin solution. This resin solution was diluted with deionized water to a solids concentration of 10 wt. %, and the resulting aqueous solution was charged into a plastic-made vessel. In the aqueous solution, an aluminum plate of 50 cm² in surface area was immersed, as one electrode (as the electrode 4 in FIG. 1), to an immersed area of $S_1$, while an aluminum plate of 2 mm in width was immersed, as the other electrode (as the electrode 3 in FIG. 1), to an immersed area of $S_2$, to prepare a rectifier.

The thus prepared rectifier was so wired as shown in FIG. 1, and the immersed area of the electrode 3 was varied to such $S_1/S_2$ ratios as shown in FIG. 5. Subsequently, an alternating current was impressed between the input terminals 5 and 6, and the wave images appeared on a synchroscope were observed to obtain such wave images as shown in FIG. 5.

The article to be coated and opposite electrode immersed in the electrodeposition coating bath used in Example 1 were connected, respectively, to the output terminals 8 and 7 of the above-mentioned rectifier, which had been so wired as shown in FIG. 1, and electrodeposition coating was effected in the same manner as in Example 1 to obtain a coated article bearing a film having a thickness of 22 μ and a gloss value of 83 %.

EXAMPLE 6

|  | Parts by weight |
|---|---|
| 2-Diethylaminoethyl methacrylate | 10 |
| 2-Hydroxyethyl methacrylate | 15 |
| n-Butyl acrylate | 30 |
| Ethyl acrylate | 25 |
| Methyl methacrylate | 20 |
| Ethyl Cellosolve | 140 |
| Azobisisobutyronitrile | 5.2 |
| Dodecylmercaptan | 5.2 |

One-third of a monomer mixture of the above-mentioned composition was fed to a polymerized, and polymerization of the monomer mixture was initiated at 80° C. Into the monomer mixture under polymerization, the remainder of the monomer mixture was dropped over a period of 3 hours. After completion of the dropping, the mixture was polymerized at said temperature for 4 hours to obtain a resin solution (H). To 100 parts by weight of the resin solution (H) was added formic acid in such proportions as to provide α' values of 0.5, 1.0, 1.2, 1.5 and 2.0 to prepare five kinds of resin solutions. Each of the resin solutions was charged with 15 parts by weight of deionized water and 10 g of an H type cation-exchange resin having a particle size of 5 to 150 μ, and then subjected to the same ion-exchange treatment as in Example 5. The thus treated resin solution was diluted with deionized water to a solids concentration of 10 wt. %. Using the resulting aqueous dilution, a rectifier was prepared in the same manner as in Example 5, except that the immersed area ratio $S_1/S_2$ was fixed to 10. The rectifier was so wired as shown in FIG. 1, and an alternating current of 60 Hz and 100 V was impressed between the input terminals 5 and 6. The wave images appeared on a synchroscope were as shown in FIG. 7.

The above-mentioned purified resin solution having an α' value of 1.0 was diluted with deionized water to a solids concentration of 10 wt. %, and the resulting aqueous solution was charged into four plastic-made vessels. In the aqueous solution in each of the said four vessels, the same two electrodes as in Example 5 were immersed to an immersed area ratio $S_1/S_2$ of 10 to prepare a composite rectifier. The rectifier was so wired as shown in FIG. 2, and an alternating current was impressed between the input terminals 5 and 6 to confirm that a rectified current showing such a continuous wave image as seen in FIG. 4 was continuously taken out of the output terminals 7 and 8.

What is claimed is:

1. A rectifier comprising a vessel filled with a solution selected from the group consisting of an aqueous solution or an aqueous dispersion of a salt of purified polycarboxylic acid resin, and two electrodes immersed therein, wherein the ratio $S_1/S_2$ of the area $S_1$ of one electrode at the portion immersed in said aqueous solution or dispersion to the area $S_2$ of the other electrode at the portion immersed in said aqueous solution or dispersion is in the range from 1.5 to 300, said salt having a $pK_a(r)$ value, as defined by the formula (I) shown below, of 8.0 or more, an $n$ value of 0.5 to 15 and an α value of 0.8 to 2.0, and containing 5 weight % or less of acidic impurities having a $pK_a(e)$ value, as defined by the formula II shown below, of at least 0.5 smaller than the $pK_a(r)$ value of the said polycarboxylic acid resin:

$$pH = pK_a(r) + n \log (\alpha/1 - \alpha) \quad (I)$$

wherein pH is the pH value of an aqueous solution or dispersion of the salt of the polycarboxylic acid resin; $pK_a(r)$ is the constant -log $K_a(r)$ $K_a(r)$ is the dissociation constant in water of the polycarboxylic acid resin; $n$ is a numeral constant and α is the degree of neutralization of the polycarboxylic acid resin with a base, $$pH = pK_a(e) + \log (\alpha_1/1 - \alpha_1) \quad (II)$$

wherein pH is the pH value of an aqueous solution of the acidic impurities; $pK_a(e)$ is the constant -log $K_a(e)$; (e); $K_a(e)$ is the dissociation constant in water of the acidic impurities; and $\alpha_1$ is the degree of neutralization of the acidic impurities with a base.

2. A rectifier according to claim 1, wherein the salt of a purified basic resin has a $pK_b(r)$ value, as defined by the formula (III) shown below, of 6.0 or more, an $n'$ value of 0.5 to 1.5 and an α' value of 0.3 or more, and contains 5 wt. % or less of basic impurities having a $pK_b(e)$ value, as defined by the formula (IV) shown below, of at least 0.5 smaller than the $pK_b(r)$ value of the said basic resin:

$$pOH = pK_b(r) + n' (\alpha'/1 - \alpha') \quad (III)$$

wherein pOH is the pOH value of an aqueous solution or dispersion of the salt of the basic resin; $pK_b(r)$ is the constant -log $K_b(r)$; $K_b(r)$ is the dissociation constant in water of the basic resin; $n'$ is a numeral constant and α' is the degree of neutralization of the basic resin with an acid, $$pOH = pK_b(e) + \log (\alpha_1'/1 - \alpha_1') \quad (IV)$$

wherein pOH is the pOH value of an aqueous solution of the basic impurities; $pK_b(e)$ is the constant -log $K_b(e)$; $K_b(e)$ is the dissociation constant in water of the basic impurities; and $\alpha_1'$ is the degree of neutralization of the basic impurities with an acid.

3. A rectifier according to claim 2, wherein the α' value is from 0,8 to 2.0.

4. A rectifier according to claim 1, wherein the ratio $S_1/S_2$ is from 10 to 100.

5. A rectifier according to claim 1, wherein, of the two electrodes in each chamber of the rectifier, one electrode, which is smaller in area at the portion immersed in the aqueous solution or dispersion than the other electrode, is an electrode made of a metal selected from the group consisting of Al, Ti, Nb, Ta, W and Zr, or of an alloy of said metals.

6. A rectifier comprising four vessels $a$, $b$, $c$ and $d$ filled with a solution selected from the group consisting of an aqueous solution or an aqueous dispersion of a salt of purified polycarboxylic acid resin, and two electrodes immersed in each vessel, wherein the ratio $S_1/S_2$ of the area $S_1$ of one electrode at the portion immersed in said aqueous solution or dispersion, and electrode being represented by each of 3a, 3b, 3c and 3d, to the area $S_2$ of the other electrode at the portion immersed in said aqueous solution or dispersion, said electrode being represented by each of 4a, 4b, 4c and 4d, is in the range from 1.5 to 300; the electrodes are so wired with each other as to form combinations of 3a with 4d, 3b with 4c, 4a with 4b and 3c with 3d; and the thus formed four combinations are connected to an input terminal (5), an input terminal (6), an output terminal (8) and an output terminal (7), respectively, said salt having a $pK_a(r)$ value, as defined by the formula (I) shown below, of 8.0 or more, an $n$ value of 0.5 to 15 and an α value of 0.8 to 2.0, and containing 5 weight % or less of acidic impurities having a $pK_a(e)$ value, as defined by the formula II shown below, of at least 0.5 smaller than the $pK_a(r)$ value of the said polycarboxylic acid resin:

$$pH = pK_a(r) + n \log (\alpha/1 - \alpha) \quad (I)$$

wherein pH is the pH value of an aqueous solution or dispersion of the salt of the polycarboxylic acid resin; $pK_a(r)$ is the constant -log $K_a(r)$; $K_a(r)$ is the dissociation constant in water of the polycarboxylic acid resin; $n$ is a numeral constant and α is the degree of neutralization of the polycarboxylic acid resin with a base, $$pH = pK_a(e) + \log (\alpha_1/1 - \alpha_1) \quad (II)$$

wherein pH is the pH value of an aqueous solution of the acidic impurities; $pK_a(e)$ is the constant -log $K_a(e)$; $K_a(e)$ is the dissociation constant in water of the acidic impurities; and $\alpha_1$ is the degree of neutralization of the acidic impurities with a base.

7. A method for rectifying an alternating current which comprises filling four chambers $a$, $b$, $c$ and $d$ with a solution selected from the group consisting of an aqueous solution or an aqueous dispersion of a salt of purified polycarboxylic acid resin; immersing a pair of two electrodes in each of the said chambers to such an extent that the ratio $S_1/S_2$ of the area $S_1$ of one electrode at the portion immersed in said aqueous solution or dispersion, said electrode being represented by each of 3a, 3b, 3c and 3d, to the area $S_2$ of the other electrode at the portion immersed in said aqueous solution or dispersion, said electrode being represented by each of 4a, 4b, 4c and 4d, becomes a value in the range from 1.5 to 300; connecting the electrodes with one another so as to form such combinations as 3a with 4d, 3b with 4c, 3c with 3d and 4a with 4b; connecting the thus formed four combinations to an input terminal (5), an input terminal (6), an output terminal (7) and an output terminal (8), respectively; and connecting the input terminals (5) and (6) to an alternating current source to take out a rectified current from the output terminals (7) and (8), said salt having a $pK_a(r)$ value, as defined by the formula (I) shown below, of 8.0 or more, an $n$ value of 0.5 to 15 and an $\alpha$ value of 0.8 to 2.0, and containing 5 weight % or less of acidic impurities having a $pK_a(e)$ value, as defined by the formula II shown below, of at least 0.5 smaller than the $pK_a(r)$ value of the said polycarboxylic acid resin:

$$pH = pK_a(r) + n \log (\alpha/1 - \alpha) \tag{I}$$

wherein pH is the pH value of an aqueous solution or dispersion of the salt of the polycarboxylic acid resin; $pK_a(r)$ is the constant -log $K_a(r)$ is the dissociation constant in water of the polycarboxylic acid resin; $n$ is a numeral constant and $\alpha$ is the degree of neutralization of the polycarboxylic acid resin with a base, $$pH = pK_a(e) + \log (\alpha_1/1 - \alpha_1) \tag{II}$$

wherein pH is the pH value of an aqueous solution of the acidic impurities; $pK_a(e)$ is the contant -log $K_a(e)$; $K_a(e)$ is the dissociation constant in water of the acidic impurities; and $\alpha_1$ is the degree of neutralization of the acidic impurities with a base.

8. A method according to claim 6, wherein, of the two electrodes in each chamber of the rectifier, one electrode, which is smaller in area at the portion immersed in the aqueous solution or dispersion than the other electrode, is an electrode made of a metal selected from the group consisting of Al, Ti, Nb, Ta, W and Zr, or of an alloy of said metals.

9. A method according to claim 7, wherein the salt of a purified basic resin has a $pK_b(r)$ value, as defined by the formula (III) shown below, of 6.0 or more, an $n'$ value of 0.5 to 1.5 and an $\alpha'$ value of 0.3 or more, and contains 5 wt. % or less of basic impurities having a $pK_b(e)$ value, as defined by the formula (IV) shown below, of at least 0.5 smaller than the $pK_b(r)$ value of the said basic resin:

$$pOH = pK_b(r) + n' \log (\alpha'/1 - \alpha') \tag{III}$$

wherein pOH is the pOH value of an aqueous solution or dispersion of the salt of the basic resin; $pK_b(r)$ is the constant -log $K_b(r)$; $K_b(r)$ is the dissociation constant in water of the basic resin; $n'$ is a numeral constant and $\alpha'$ is the degree of neutralization of the basic resin with an acid, $$pOH = pK_b(e) + \log \alpha'/1 - \alpha_1' \tag{IV}$$

wherein pOH is the pOH value of an aqueous solution of the basic impurities; $pK_b(e)$ is the constant -log $K_b(e)$; $K_b(e)$ is the dissociation constant in water of the basic impurities; and $\alpha_1'$ is the degree of neutralization of the basic impurities with an acid.

10. A method according to claim 9, wherein the $\alpha'$ value is from 0.8 to 2.0.

11. A method for rectifying an alternating current which comprises immersing two electrodes in a vessel (1) filled with a solution selected from the group consisting of an aqueous solution or an aqueous dispersion of a salt of purified polycarboxylic acid resin to such an extent that the ratio $S_1/S_2$ of the area $S_1$ of one electrode (4) at the portion immersed in said aqueous solution or dispersion to the area $S_2$ of the other electrode (3) at the portion immersed in said aqueous solution or dispersion becomes a value in the range from 1.5 to 300, thereby preparing a rectifier; connecting one electrode (4) to a terminal (5) and the other electrode (3) to a terminal (7), and, at the same time, providing other terminals (6) and (8); and connecting the terminals (5) to (6) as input terminals to an alternating current source to take out a rectified current from the output terminals (7) and (8), or connecting the terminals (7) and (8) as input terminals to an alternating current source to take out a rectified current from the output terminals (5) and (6), said salt having a $pK_a(r)$ value, as defined by the formula (I) shown below, of 8.0 or more, an $n$ value of 0.5 to 15 and an $\alpha$ value of 0.8 to 2.0, and containing 5 weight % or less of acidic impurities having a $pK_a(e)$ value, as defined by the formula II shown below, of at least 0.5 smaller than the $pK_a(r)$ value of the said polycarboxylic acid resin:

$$pH = pK_a(r) + n \log (\alpha/1 - \alpha) \tag{I}$$

wherein pH is the pH value of an aqueous solution or dispersion of the salt of the polycarboxylic acid resin; $pK_a(r)$ is the constant -log $K_a(r)$ is the dissociation constant in water of the polycarboxylic acid resin; $n$ is a numeral constant and $\alpha$ is the degree of neutralization of the polycarboxylic acid resin with a base, $$pH = pK_a(e) + \log (\alpha_1/1 - \alpha_1) \tag{II}$$

wherein pH is the pH value of an aqueous solution of the acidic impurities; $pK_a(e)$ is the constant -log $K_a(e)$; $K_a(e)$ is the dissociation constant in water of the acidic impurities; and $\alpha_1$ is the degree of neutralization of the acidic impurities with a base.

12. A method according to claim 11, wherein the ratio $S_1/S_2$ is 10 to 100.

* * * * *